United States Patent Office 2,739,172
Patented Mar. 20, 1956

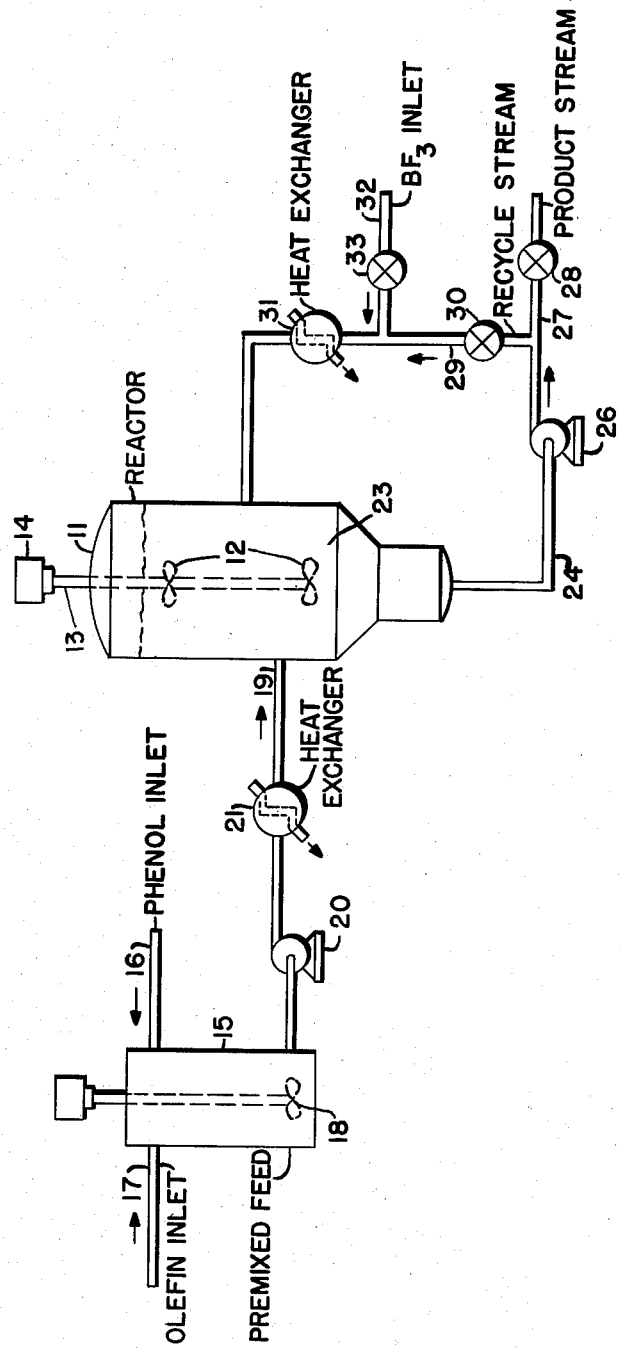

2,739,172

CONTINUOUS PROCESS FOR ALKYLATION OF PHENOLS

Theodore J. Peters, Somerville, N. J., assignor to Esso Research and Engineering Company, a corporation of Delaware Application December 1, 1952, Serial No. 323,413

4 Claims. (Cl. 260—624)

This invention relates to a continuous process for akylating phenolic materials whereby improvements in processing and product quality are obtained. It particularly relates to the alkyation of phenols wiht mono-olefinic hydrocarbons using a boron halide as a catalyst.

Alkyl phenols, suitable for use as chemical intermediates in the production of alkyl phenol sulfides, their metal salts, etc., are conventionally produced by a batch procedure. In this procedure, as taught in U. S. 2,398,253, issued on April 9, 1946, in the names of D. T. Rogers and Herman Feldhusen, Jr., boron halide catalyst is first added to the phenol, and olefin is then added to this mixture in controlled amounts until the akylation reaction is completed. This mode of operation has been necessary in order to obtain substantially complete conversion of phenol, since free phenol in the product leads to sludge formation and other undesirable effects in subsequent sulfurization operations.

The batch process has a number of disadvantages. When olefin is first added to the phenol-boron fluoride mixture, no reaction occurs until a brief induction period has elapsed, after which the highly exothermic reaction is initiated with almost explosive violence. Reaction temperatures are quite difficult to control at this point, and such variations in temperatures frequently impair the quality of the final product. Considerable time is often required to complete olefin addition in order to prevent reaction temperature "run-aways" and to reduce the content of unreacted phenol to a low level. Furthermore, the ratios of reactants are constantly changing throughout the reaction, the phenol to olefin ratio being quite high in the first portion of the reaction and gradually decreasing as more olefin is added. Catalyst concentrations likewise vary considerably. As a result, the products from different batches sometimes vary over a wide range of compositions. These inconsistencies in composition lead to subsequent processing difficulties and to lowering of product quality of derivatives of the alkyl phenols. It is a primary object of the present invention to provide a process that overcomes these disadvantages.

In accordance with the present invention, the alkylation reaction is carried out as follows: Phenol and olefin are contacted with boron halide in a reaction zone until the reaction is initiated as evidenced by the evolution of heat. The resulting reaction mixture, comprising chiefly alkylate product, then contains the active catalyst for the subsequent reaction. The reaction proceeds by continuously charging premixed feed and boron halide in separate streams into the stirred reaction mixture. A portion of the reaction mixture is continuously removed from the system as product, the amount being sufficient to provide a suitable residence time for the reactants in the pool. A constant reaction temperature is maintained by means of cooling coils located in the reaction mixture, by using a jacketed reactor, or preferably by continuously recycling and cooling a portion of the reaction mixture. It is also preferred to inject the boron halide into the recycle stream ahead of the cooling means in order to obtain good heat control.

In contrast to batch operations, the present process provides smooth operation and products of uniform composition for extended periods of time. Temperature control is easily maintained, and temperature "run-aways" during the start-up period are eliminated. This mode of operation also provides substantially complete reaction of the phenol in a relatively short reaction period; this result is quite unexpected in view of the unfavorable results obtained in batch operations when adding boron halide to the premixed feed constituents. Furthermore, undesirable side reactions such as polymerization of the olefins are minimized in the continuous operation.

It is not desired to be bound by theoretical considerations, but the improvements effected in this process are believed to be due, in part at least, to the following factors. The active catalyst in the batch process appears to be a complex of boron halide and phenol, and this complex evidently is formed during the induction period followed by a violent reaction when olefin is added. If boron halide is added to a mixture of phenol and olefin in a batch system, the volume of unreacted materials is relatively large, and olefin is apparently selectively polymerized leaving excessive amounts of unreacted phenol.

On the other hand, the active catalyst in the continuous system appears to be a material of different and easily controlled activity. In view of the method of preparation, it is believed to be largely a complex of boron halide and alkylated phenol. By adding a relatively small amount of feed to a relatively large body of product containing active catalyst, the heat of reaction is controlled and the induction period is eliminated. By using a premixed feed, the phenol and olefin are in intimate contact with each other and are in the proper ratio when they contact the catalyst. They therefore selectively form the desired alkyl phenol rather than polymers. Although catalyst is continuously withdrawn with the product, the fresh boron halide added to the system continuously forms active catalyst to replace that removed.

The process will now be discussed in detail in conjunction with the sole figure which illustrates a preferred mode of carrying out the invention. Referring to the figure, the numeral 11 designates an elongated reactor equipped with an agitating means such as propellers 12 fixed to rotatable shaft 13, which in turn is connected to prime mover 14.

The phenol and olefin to be reacted are charged into feed tank 15 via lines 16 and 17, respectively, and are thoroughly mixed by agitator 18. The premixed feed is continuously charged through line 19 containing pump 20 and heat exchange means 21 into reactor 11. Heat exchanger 21 may be used to heat or cool the feed depending on heat balance requirements. Zone 11 may be equipped with a jacket through which a cooling medium may flow or may contain a cooling coil or other cooling means not shown.

Zone 11 contains a pool or body of liquid 23 comprising essentially the reaction products and also contains the active catalyst. The phenol and olefin feed are directly charged into this pool.

Zone 11 is also provided with an effluent product drawoff line 24 equipped with pump 26. A portion of the effluent is withdrawn as a product stream through line 27 containing control valve 28, and the remaining portion is recycled through line 29 containing control valve 30. This recycled stream is conveniently passed through heat exchange means 31 wherein it is generally reduced to a lower temperature for controlling reaction temperature in zone 11. The ratio of the product to recycle streams is conveniently controlled by adjusting valves 28 and 30.

Boron trifluoride ($BF_3$) may be added directly to the reaction zone, but it is preferably introduced continuously into the recycle stream by means of line 32 containing control valve 33. By injecting the $BF_3$ into this stream ahead of heat exchanger 31, heat control is improved.

In starting up the operation, it is convenient to charge zone 11 with a portion of the premixed feed. While agitating this mixture, boron trifluoride is introduced in small, carefully controlled quantities. The momentary temperature rise resulting from the initial introduction of the catalyst is readily controlled by recycle cooling. Additional feed and $BF_3$ are added until the required volume of reaction mixture containing active catalyst is formed. The system is then brought to equilibrium conditions by controlling feed, catalyst, product withdrawal and recycle rates.

The present invention applies not only to the alkylation of phenol itself but also the alkylation of other monohydroxy aromatic compounds such as the alkylated phenols, naphthols and the like. The invention is also applicable to the alkylation of compounds of the class described which contain substituted atoms or groups which do not interfere with the alkylation reaction. Such groups include ester, keto, aldehyde, other alkyl groups and the like. Naturally occurring phenols, such as those obtained by alkaline extraction of certain petroleum stocks, from cashew nut shell liquid, from coal coking or from other vegetable oil sources may be used.

The olefins useful in the alkylation step may be straight or branched chain mono olefins having any suitable molecular weight. Those having in the range of about 4 to 20 carbon atoms, particularly from 6 to 16 carbon atoms, are preferred. Alkyl phenols produced from such materials are especially suitable as intermediates for producing oil soluble alkyl phenol sulfides and other useful chemical intermediates. The olefins may be the various individual olefins or olefin-containing mixtures derived from petroleum sources such as refinery gases containing propylene, butylenes, amylenes and the like. The olefin polymers such as diisobutylene, triisobutylene, tripropylene, and other polymers obtained by polymerization of the lower olefins are particularly suitable. Tertiary olefins are generally more suitable than the less reactive primary and secondary olefins.

The ratio of olefin to phenol in the feed will generally depend on the reactivity of the individual components and the type of product to be made. Thus, substantially equal molecular proportions, such as an olefin to phenol mol ratio in the range of about 0.95:1.0 to 1.2:1.0 will be preferred when monoalkyl phenols are made. This will suppress the formation of undesirable side products and maintain the amount of unreacted phenol in the product at a low level. Obviously, if it is desired to produce predominantly dialkyl phenols, the olefin to phenol ratio usually must be considerably higher than those given in the above ranges. Large excess of phenol must be avoided since unreacted phenol in the product is harmful. Large excesses of olefin in the feed results in selective polymerization which gives contaminated products.

In order to produce products of uniform quality, the boron halide charge rate should be constant during the reaction. The amount of boron halide needed appears to vary with the re-activity of the olefin used, i. e., when tert.-olefins are being used as alkylating agents, the amount of boron halide is somewhat less than that required when using the less reactive primary and secondary olefins. As a general rule, in the range of about 0.8 to 5% by weight of boron halide, based on the phenol feed, will be required. In the range of 0.9 to 1.5 weight per cent is generally preferred when using tert.-olefins. The catalyst remains in the withdrawn product, thus it is essential to feed $BF_3$ continuously in order to maintain a constant catalyst activity. The reaction temperature is generally in the range of about 50° to 100° C., and preferably below about 80° C. in order to suppress the formation of undesirable reaction products.

It is necessary to maintain the reactants in a dilute state in the reaction pool for several reasons. In the first place, more favorable equilibrium relationships between desired alkylated phenol and undesired side reaction products are obtained when using higher ratios of reaction pool to feed. In the second place, the presence of only small concentrations of unreacted phenol and olefin in the reaction pool at a given time is essential if temperature "run-aways" are to be avoided and if selective alkylation is obtained. Although the alkylation reaction seems to be instantaneous, the average residence time of the reactants and pool in the reaction zone will be sufficient to obtain favorable equilibrium relationships and dilution factors. Usually above 5 minutes and preferably in the range of 10 to 120 minutes will be suitable.

The reaction pool should be well mixed during the reaction in order to obtain uniform dilution of reactants and uniform contact with active catalyst. This may be done by mechanical agitation devices, jetting a recycled stream into the pool, etc., or by other methods known to the art.

It is important, for reasons mentioned above, to avoid intimate contact of the boron halide and the reactants before they enter the reaction pool. A preferred method is to introduce $BF_3$ into the pool at a point where substantial cooling will take place, such as in the recycle stream ahead of a cooling means as shown in the drawing. However, in a well mixed, jacketed reactor, satisfactory heat control is obtained by injecting the $BF_3$ directly into the pool in the reactor.

The invention will now be illustrated in conjunction with the following specific examples. These examples however are not to be construed as limiting the scope of the present invention.

*Example 1*

A reaction zone was provided with a lower jacketed portion and a feed inlet line going into the jacketed portion. A premixed feed stock containing diisobutylene and phenol in a mol ratio of 1.1:1.0 was charged into the bottom of the reactor. Boron trifluoride was then metered to the bottom of the reaction zone in an amount sufficient to cause reaction. The heat of reaction was readily controlled by cooling the jacketed section of the reactor. A liquid pool comprising the reaction products and active catalyst was thus formed. Continuous operation was initiated by charging the feed and $BF_3$ at a constant rate and withdrawing product continuously. When employing an olefin to phenol mol ratio of 1.1:1.0, 1.0 weight per cent $BF_3$ based on the phenol, and an average residence time of 45 minutes at a temperature of 75° C., it was found that a product of uniform composition was easily and continuously produced. The product averaged 75-80% by weight of tert.-octyl phenol and contained less than 1.0 weight percent unreacted phenol. The remainder of the product was largely light ends boiling in the range of 105° to 160° C., and heavy ends boiling above 170° C.

A conventional commercial batch operation was carried out by first adding $BF_3$ to phenol and then adding the diisobutylene to the mixture until the reaction was completed. The overall olefin to phenol mol ratio and amount of $BF_3$ and the reaction temperature employed in this run were the same as those employed in the continuous operation. An olefin addition time of two hours was required to avoid excessive temperature rise. The final product contained about 3% by weight of unreacted phenol and 70% by weight of tert.-octyl phenol. In batch operations in which $BF_3$ was added to premixed olefin and phenol, even greater amounts of unreacted phenol remained in the product and heat control was more difficult.

In series of runs carried out in the above continuous unit, yields of above 80% tert.-octyl phenol were obtained when using olefin to phenol mol ratios in the range of 0.95:1.0 to 1.1:1.0, temperatures below 75° C., BF₃ concentration in the range of about 0.9 to 1.3% based on the phenol, and residence times in the range of 10 to 90 minutes. Unreacted phenol in the product was easily maintained below a 2–3% level.

In producing alkyl phenol sulfides from these products by treatment with sulfur chloride, above 3 weight percent unreacted phenol in the product cannot be tolerated because of the insoluble and other undesirable reaction products formed during the sulfurization step. For this reason, the alkylation step must be conducted in such a manner that the product is of suitable purity for sulfurization without intermediate purification steps. The continuous operation of the present invention showed considerable advantage over batch operations in this respect.

*Example 2*

Continuous runs were carried out in which a $C_7$ olefin, resulting from the co-polymerization of propylenes and butylenes, and a $C_9$ polypropylene fraction were used as feed stocks for alkylating phenol. These olefins contained substantial quantities of primary and secondary olefins. Runs were carried out by the procedure and in the continuous alkylation unit described in Example 1. Reaction temperatures ranged from about 60° to 95° C. As much as 3 to 4 weight percent BF₃, based on the phenol, and olefin to phenol mol ratios of as high as 1.15:1.0 were needed to give good yields of monoalkyl phenol and to keep the amount of unreacted phenol in the product at a low level.

*Example 3*

A continuous alkylation unit, having a design substantially the same as that shown in the drawing, was employed for alkylating phenol with diisobutylene. In these runs, a catalytically active reaction pool was first formed by charging premixed feed into the reaction zone, and recycling the feed through an exterior cooler. BF₃ was metered into the feed in the recycle line ahead of the cooler. As the reaction proceeded, exothermic heat was removed by the cooler. When the reaction pool reached a satisfactory level in the reactor, premixed feed was continuously introduced into the stirred pool, BF₃ was continuously introduced into the recycle pool stream and product was continuously removed from the system. The ratio of recycle stream to product withdrawn was about 5:1. A uniform reaction temperature was easily maintained by this system. High yields of desired alkyl phenol and low yields of undesirable polymers and unreacted phenols were obtained.

While the invention has been described in connection with a single reaction zone, two or more zones connected in series may be used. Other modifications of the invention will be obvious to one skilled in the art.

What is claimed is:

1. A process for alkylating phenol with a tertiary monoolefin having 6 to 16 carbon atoms per molecule which comprises continuously introducing as a separate stream a premixed feed containing the phenol and the olefin into a reaction mixture in an alkylation zone containing alkylated phenol, the mole ratio of olefin to phenol in said premixed feed being in the range of 0.95:1.0 to 1.2:1.0, continuously introducing boron trifluoride catalyst as a separate stream to said alkylation zone, the amount of boron trifluoride introduced to said alkylation zone being in the range of about 0.9 to 1.5% by weight based on the phenol introduced to said alkylation zone, and continuously removing from said alkylation zone a portion of said reaction mixture containing alkylated phenol, the temperature in said alkylation zone being in the range of about 50° to 100° C. and the average residence time of said reaction mixture in said alkylation zone being in the range of about 10 to 90 minutes.

2. A process as in claim 1 wherein the reaction temperature in said alkylation zone is controlled by recycling and cooling a portion of said reaction mixture.

3. A process as in claim 2 wherein said boron trifluoride catalyst is added to the recycled portion before cooling.

4. A process for preparing tert. octyl phenol which comprises continuously introducing as a separate stream a premixed feed containing phenol and diisobutylene into a reaction mixture in an alkylation zone containing tert. octyl phenol, the mole ratio of diisobutylene to phenol being about 1.1:1.0, continuously introducing boron trifluoride catalyst as a separate stream into said alkylation zone, the amount of said boron trifluoride catalyst introduced into said alkylation zone being about 1.0 weight percent based on the phenol introduced to said alkylation zone, and continuously removing from said alkylation zone a portion of said reaction mixture containing tert. octyl phenol and containing less than about 1.0 weight percent of unreacted phenol, the temperature in said alkylation zone being about 75° C. and the average residence time of said reaction mixture in said alkylation zone being about 45 minutes.

References Cited in the file of this patent

UNITED STATES PATENTS

| | | |
|---|---|---|
| 2,232,674 | Pyzel | Feb. 18, 1941 |
| 2,398,253 | Rogers | Apr. 9, 1946 |
| 2,414,764 | Pfennig | Jan. 21, 1947 |